E. E. G. HEDENSTROM.
CONTROLLING AND STABILIZING DEVICE.
APPLICATION FILED APR. 8, 1918.
1,335,055.
Patented Mar. 30, 1920
6 SHEETS—SHEET 1.
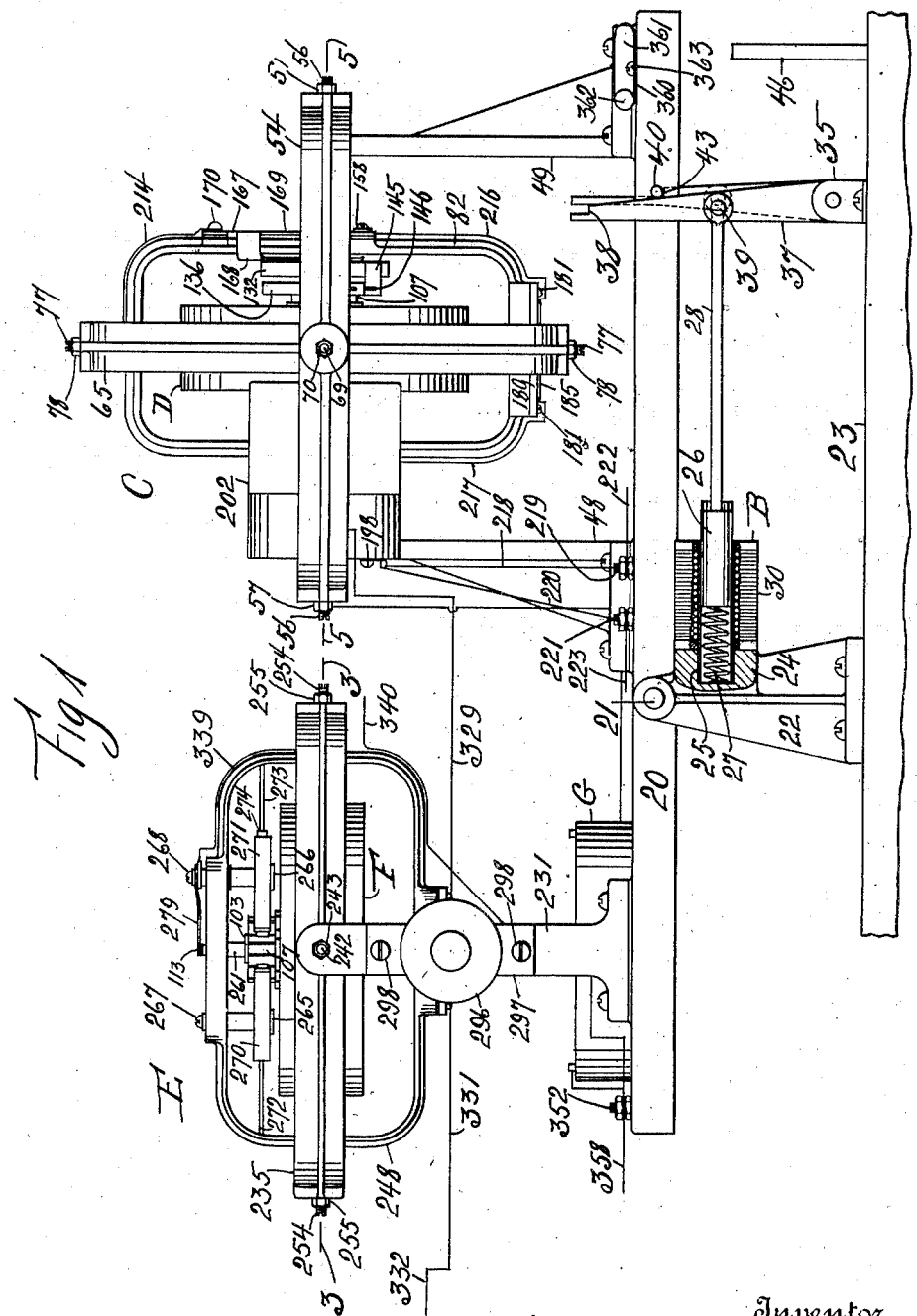

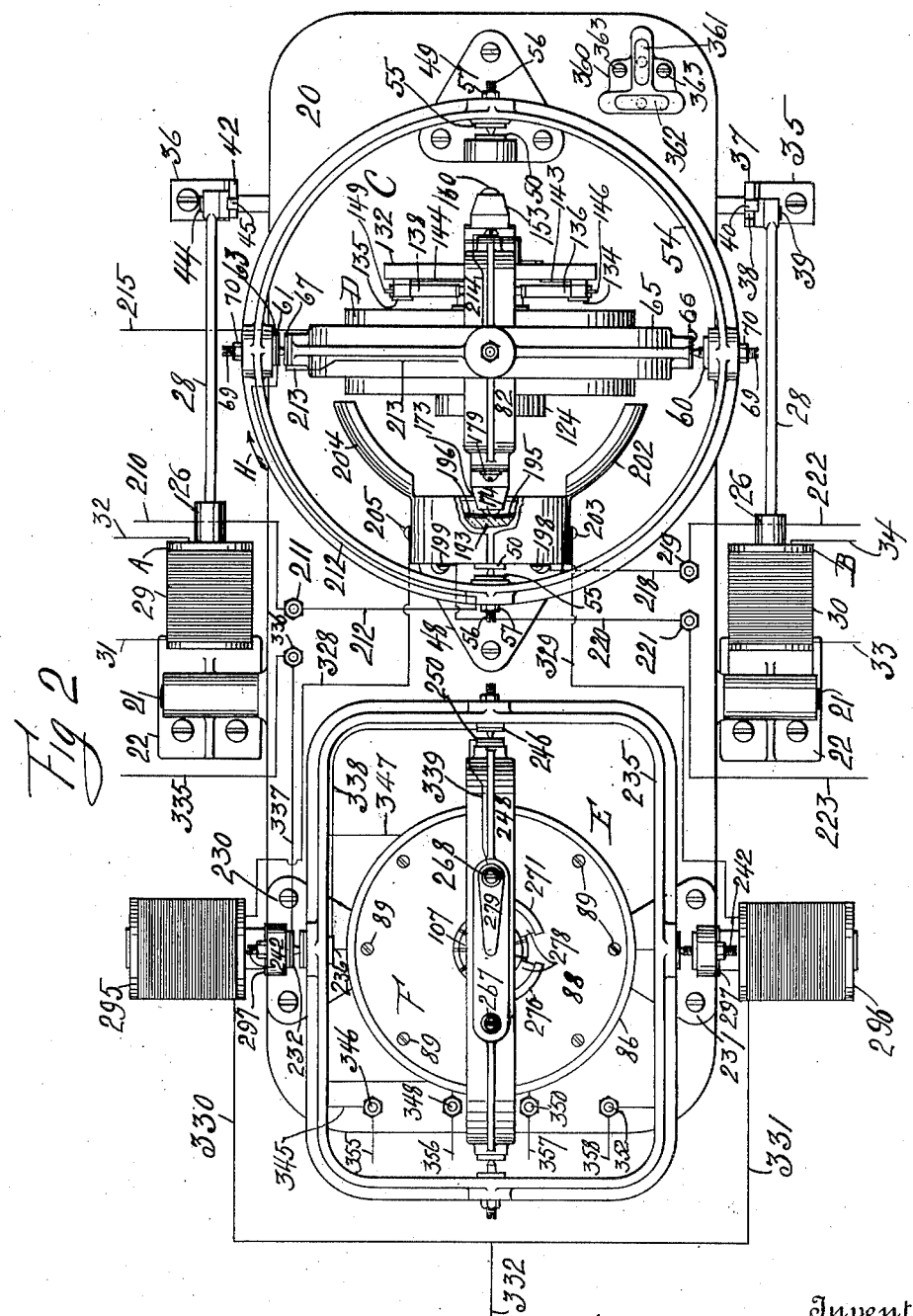

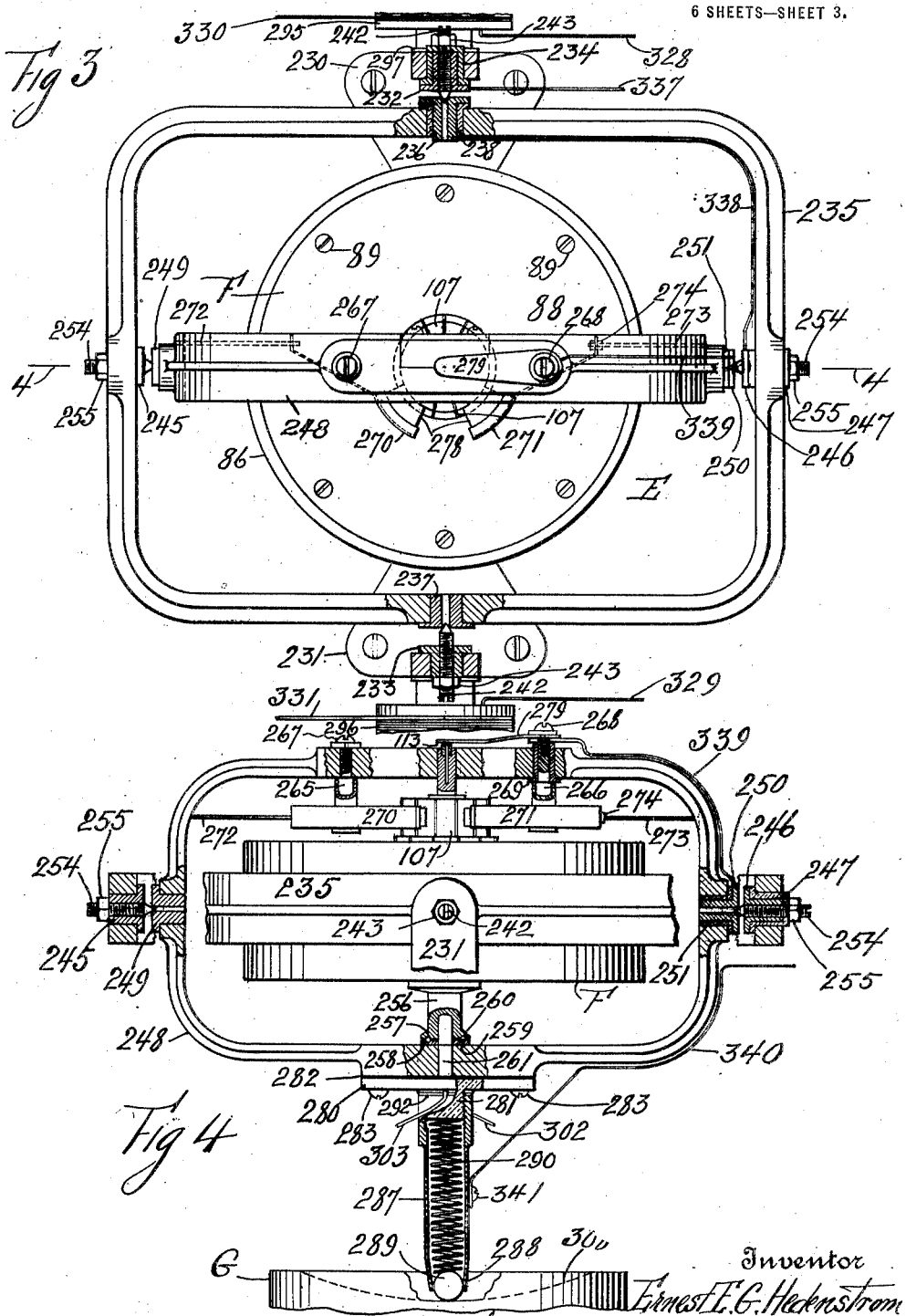

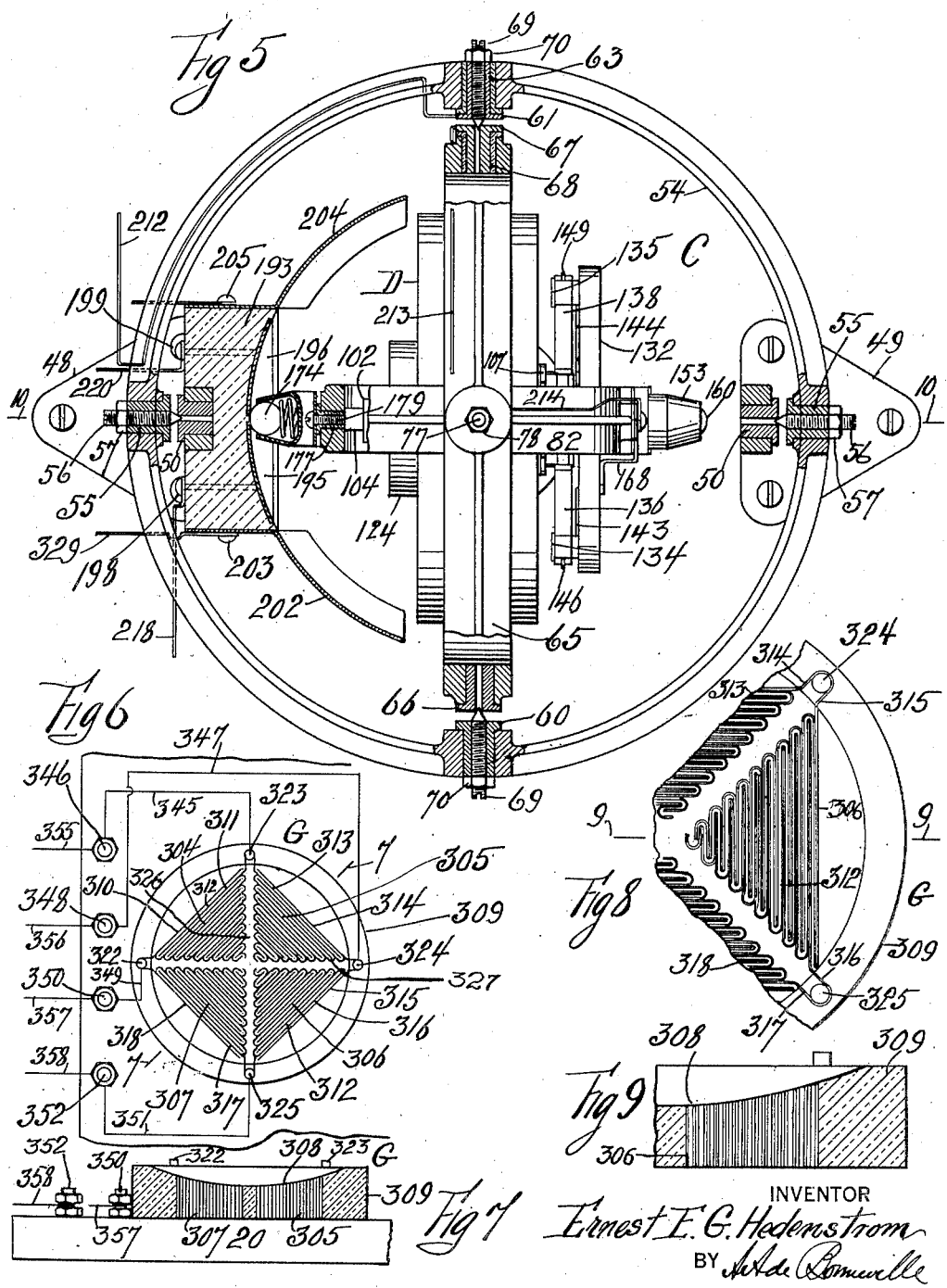

E. E. G. HEDENSTROM.
CONTROLLING AND STABILIZING DEVICE.
APPLICATION FILED APR. 8, 1918.
1,335,055.
Patented Mar. 30, 1920.
6 SHEETS—SHEET 5.
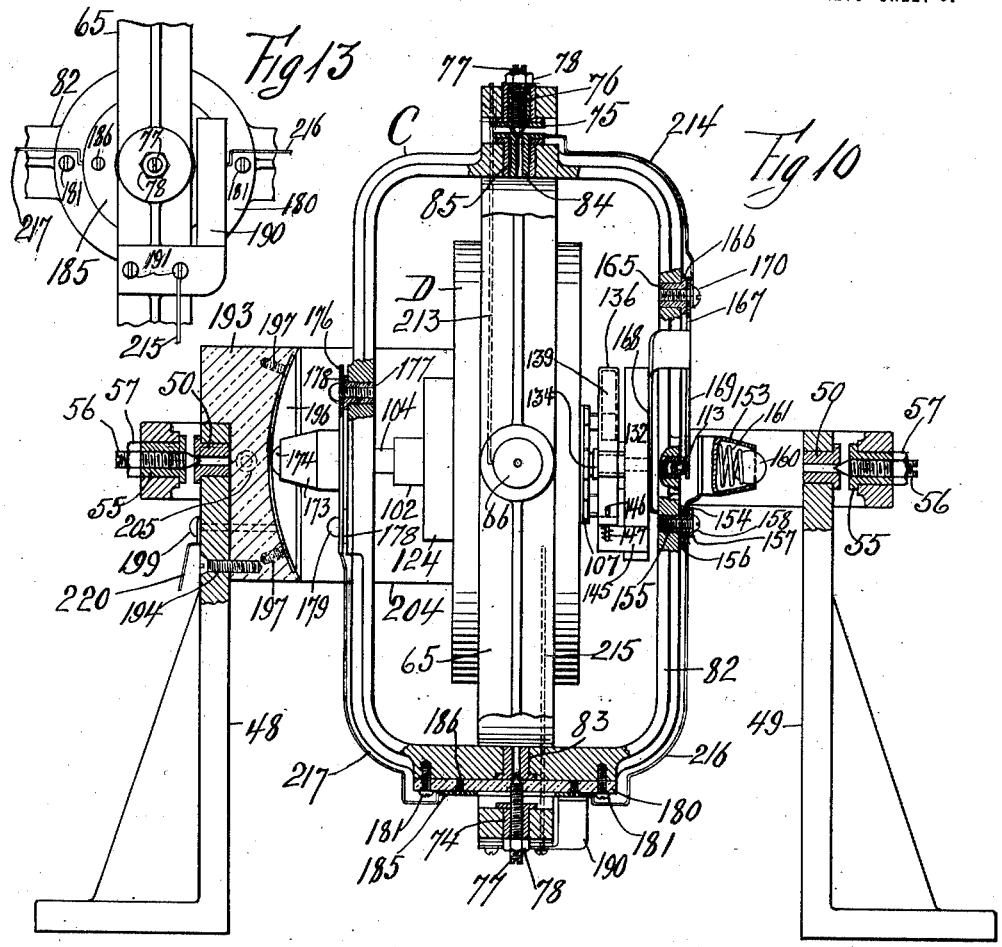
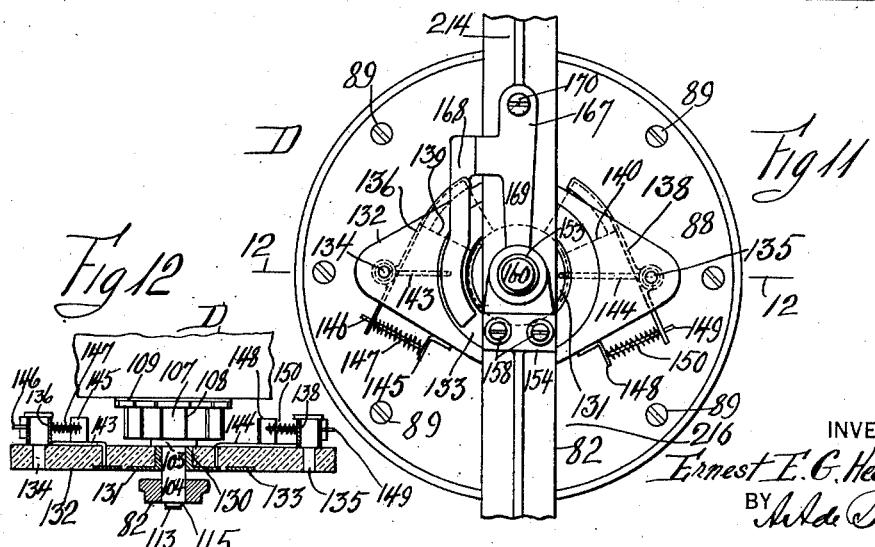
INVENTOR
Ernest E. G. Hedenstrom
BY A. A. de Bonneville
ATTORNEY E. E. G. HEDENSTROM.
CONTROLLING AND STABILIZING DEVICE.
APPLICATION FILED APR. 8, 1918.
1,335,055.
Patented Mar. 30, 1920.
6 SHEETS—SHEET 6.
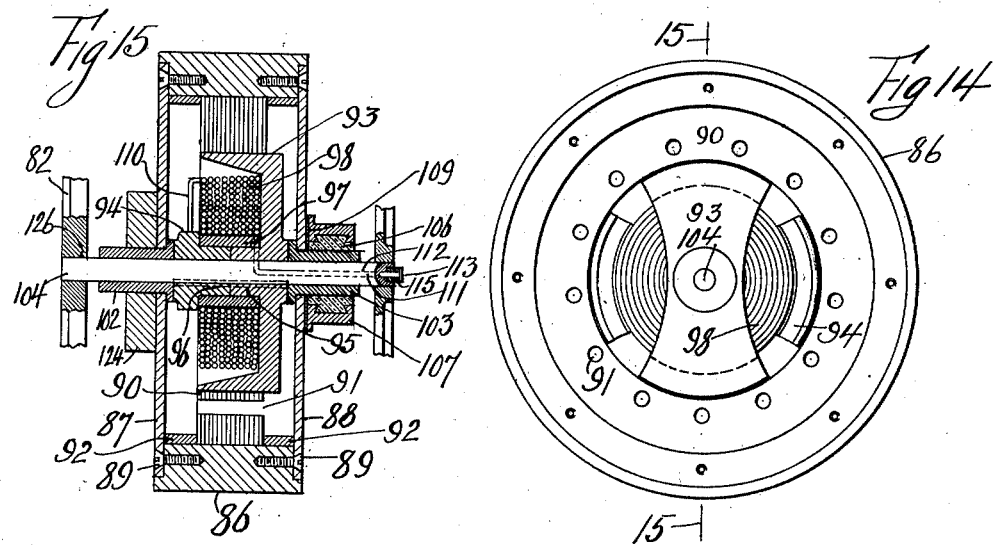
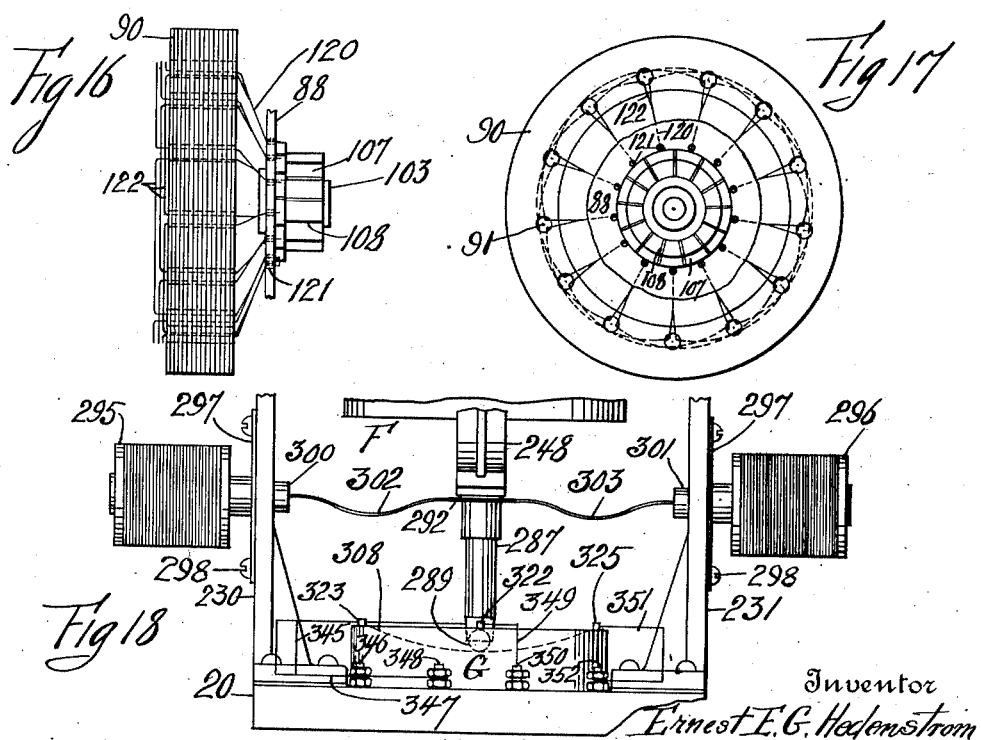
Inventor
Ernest E. G. Hedenstrom
By his Attorney
A. A. de Domeville

UNITED STATES PATENT OFFICE.

ERNEST E. G. HEDENSTROM, OF BROOKLYN, NEW YORK, ASSIGNOR TO SPRINGFIELD MOTORS COMPANY, OF WILMINGTON, DELAWARE, A CORPORATION OF DELAWARE.

CONTROLLING AND STABILIZING DEVICE.

1,335,055.

Specification of Letters Patent.

Patented Mar. 30, 1920.

Application filed April 8, 1918. Serial No. 227,410.

*To all whom it may concern:*

Be it known that I, ERNEST E. G. HEDENSTROM, a subject of Great Britain, and a resident of the borough of Brooklyn, city of New York, in the county of Kings and State of New York, have invented certain new and useful Improvements in Controlling and Stabilizing Devices, of which the following is a specification.

This invention relates to a controlling and stabilizing device, which may be used to control the upward and downward travel and stabilize an aeroplane. Its organization comprises an oscillating bed plate, two electrically driven gyroscopes mounted on said bed plate. Solenoids coacting with other mechanism locate the bed plate in various angular positions. Contact plates coacting with contact elements in the gyroscopes close various electric circuits, which in turn actuate independent mechanism. Electrical connections between the two gyroscopes enable one gyroscope to control the positions of the other at predetermined intervals of time.

Figure 1 represents a front elevation of the electric controlling device with a portion in section; Fig. 2 shows a top plan view of Fig. 1 partly in section; Fig. 3 represents an enlarged top plan view of a portion of Fig. 1 and a partial section of Fig. 1 on the line 3, 3; Fig. 4 represents a partial front view and partial section of Fig. 3 on the line 4, 4; Fig. 5 represents an enlarged top plan view of another portion of Fig. 1 and a partial section of Fig. 1 on the line 5, 5; Fig. 6 shows a portion of Fig. 2 and an electric contact cup of the device; Fig. 7 is a partial section of Fig. 6 on the line 7, 7; Fig. 8 shows an enlarged fragmentary portion of Fig. 6; Fig. 9 represents a section of Fig. 8 on the line 9, 9; Fig. 10 shows a partial front view of Fig. 5 and a partial section of Fig. 5 on the line 10, 10; Fig. 11 is a right hand side view of a portion of Fig. 10; Fig. 12 is a partial section of Fig. 11 on the line 12, 12; Fig. 13 shows a partial bottom plan view of Fig. 10; Fig. 14 represents an enlarged view of some of the elements shown in Fig. 2; Fig. 15 shows a section of Fig. 14 on the line 15, 15; Fig. 16 shows an elevation of some of the elements of Fig. 15; Fig. 17 represents a right hand side view of Fig. 16 and Fig. 18 represents a partial left hand end view of Fig. 1.

As shown in Figs. 1 and 2 an oscillating bed plate 20 has extending from a pair of its opposite sides the pivots 21, that are supported in the journal brackets 22, that in turn are mounted on a base 23. A boss 24 is formed with each of the brackets 22 for the solenoids A and B. In each solenoid is shown the tube 25. A movable core 26, in each tube 25, bears against the spring 27 and has extending therefrom the connecting rod 28. A coil 29 is wound around the tube 25 of the solenoid A in the usual manner and a similar coil 30 is provided for the solenoid B. The ends 31 and 32 of the coil 29 are connected to an automatic switch not shown. The ends 33 and 34 of the coil 30 are connected to another automatic switch not shown. A pair of similar journal brackets are indicated at 35 and 36. To the journal bracket 35 is pivoted the trip lever 37 having the shouldered portion 38 at its outer end. A pin 39 connects the trip lever 37 to the connecting rod 28. A pin 40 extends from the bed plate 20 in the path of the said shouldered portion 38. To the journal bracket 36 is pivoted a trip lever 42 similar to the trip lever 37, but which has a shouldered portion 43 somewhat distant from its outer end. The trip lever 42 is connected to its accompanying connecting rod 28 by means of the pin 44. A pin 45 extends from the bed plate 20 in the path of the said shouldered portion 43. A stop pin 46 is located in the path of the oscillating bed plate 20.

As shown in Figs. 1, 2, 5, and 10 a pair of journal brackets 48 and 49 are secured to the oscillating bed plate 20 for the gyroscope indicated in its entirety by the letter C. Pivot bearings 50 are secured in the top ends of the journal brackets 48 and 49. The said gyroscope C comprises the outer ring 54, which has secured therein the bushings 55, that have each in threaded engagement therewith the screw pivots 56, locked in place by the lock nuts 57. The pivot bearings 50 are engaged by the screw pivots 56. The ring 54 has also secured therein the bushing 60 and diametrically opposite thereto the bushing 61, which latter is insulated from the ring 54 by means of the fiber bushing 63. An outer frame 65 has connected thereto the pivot bearing 66 and diametrically opposite to the latter, the pivot bearing 67. The latter is insulated from the frame 65 by means of the fiber bushing 68. Screw pivots 69 in the bushings 60 and 61 support the said outer frame 65. Lock nuts 70 secure the screw pivots 69 in place. To the outer frame 65 are also connected the bushings 74 and 75, the latter being insulated from said frame 65 by means of the fiber bushing 76. Screw pivots 77 are held in the bushings 74 and 75 and are locked in place by means of the lock nuts 78. An inner frame 82 has connected thereto the pivot bearings 83 and 84, the latter bearing 84 is insulated from said inner frame 82 by means of the fiber bushing 85.

A motor housing for the gyroscope C is indicated in its entirety by the letter D and is shown to comprise the ring 86 see Figs. 14 and 15, which has secured thereto the side plates 87 and 88, by means of the screws 89. A field with said housing comprises a plurality of plates 90 with openings 91, and which are held in place by the retaining rings 92. An armature for the motor comprises the pole pieces 93 and 94 which have respectively formed therewith the hubs 95 and 96. A sleeve 97 is mounted on said hubs. A coil 98 is wound around the sleeve 97. Bushings 102 and 103 are fastened respectively to the side plates 87 and 88. A shaft 104 is journaled in the bushings 102 and 103 and has fastened thereto the hubs 95 and 96 of the pole pieces. On the bushing 103 is secured the commutator ring 106 of fibrous material, on which are supported the copper segments 107. The latter are separated by the insulating plates 108. The segments 107 are insulated from the side plate 88 by means of the fiber washer 109. The coil 98 has one end 110 connected to the pole piece 94 and its other end 111 extends through the sleeve 97, the hub 95 and through an axial opening 112 in the shaft 104. A copper disk 113 is fastened to the extremity of the end 111. A fiber bushing 115 is secured in the end of the shaft 104, encircles the end 111 and bears against the copper disk 113.

Lead wires 120 extend from the copper segments 107 and pass through the openings 121 in the side plate 88. A field wire 122 extends from each lead wire 120, passes through one of the openings 91 of the plates 90, runs parallel to said plates on the outside thereof, returns through one of the other openings 91 of said plates and connects with another of the lead wires 120. A counter weight 124 is supported on the bushing 102 and bears against the side plate 87. The shaft 104 is journaled in bearings 126 formed in the inner frame 82.

On the shaft 104, see Figs. 10 and 11, is secured the sleeve 130 having the flange 131, which in turn supports the fiber brush carrier 132. A contact ring 133 concentric with the shaft 104 is carried on the fiber brush carrier 132. Pins 134 and 135 extend from the carrier 132. A brush holder 136 is pivoted on the pin 135. A brush 139 is carried on the holder 136 and a brush 140 is carried on the holder 138, the said brushes bear against the commutator segments 107. A wire 143 connects the holder 136 and the ring 133 and a wire 144 connects the holder 138 and flange 131 of the sleeve 130. A clip 145 extends from the brush carrier 132 and supports a rod 146. A spring 147 encircles said rod and bears between said clip 145 and the rear portion of the brush holder 136. A clip 148 also extends from the brush carrier 132 and supports a rod 149. A spring 150 encircles the latter rod and bears between the clip 148 and the rear portion of the brush holder 138.

A pole carrier, see Figs. 2, 5 and 10, is indicated with the tapered pocket 153 from which extends the lug 154. Bushings 155 are secured to the inner frame 82. A fiber plate 156 is located between the inner frame 82 and the lug 154. Fiber washers 157 bear on the outer face of the lug 154 and screws 158 secure the lug 154 in place. A contact ball 160 is retained in the pocket 153 and is forced against the opening thereof by means of the spring 161. A fiber bushing 165 with the flange 166 is secured in the inner frame 82. A plate 167 having the extensions 168 and 169, has one end thereof fastened to said bushing by means of the screw 170. The extension 168 bears against the contact ring 133 and the extension 169 bears against the copper disk 113.

A second pole carrier is shown with the tapered pocket 173 which latter is similar to the pocket 153 and contains a contact ball 174 similar to 160. The ball 174 is forced against the opening of the pocket 173 in a manner similar to that described for the ball 160. A foot 176 is formed with pocket 173. A pair of fiber bushings 177 with flanges 178 are secured to the inner frame 82 and insulate the foot 176 from the said inner frame 82. Screws 179 secure the foot 176 in place.

A fiber plate 180 see Figs. 10 and 13 is secured to the lower end of the inner frame 82 by means of the screws 181. A collecting ring 185 is fastened to the fiber plate 180 by means of the screws 186. A brush 190 bears against the collector ring 185, is insulated from the outer frame 65 and is connected to said frame by the screws 191. A fiber block 193 is fastened to the journal bracket 48 by the screw 194. Spherically concaved contact plates 195 and 196 are fastened to block 193 by means of screws 197. A lead 198 extends from the contact plate 195 through the fiber block 193, and a lead 199 extends from the contact plate 196 and also extends through the fiber block 193. A spherically concaved contact wing 202 extends from the fiber block 193 on one side thereof and is fastened thereto by the screw 203. A simi-contact wing 204 extends from the other side of said block and is fastened thereto by the screw 205. The curvature of the contact plates 195, 196 and the contact wings 202 and 204 are struck with a radius extending from the center of the gyroscope to the contact points of the balls 160 and 174.

As shown in Fig. 2 a feed wire 210 for electric current leads to the binding post 211 on the oscillating bed plate 20. A wire 212 leads from the binding post 211 to the outer ring 54, is carried on the latter and connects with the bushing 61. A wire 213 extends from the pivot bearing 67, is carried on the outer frame 65 and connects to the bushing 75. A wire 214 extends from the bushing 84, is carried on the inner frame 82 and is connected to the plate 167, by means of the screw 170. A feed wire 215 for electric current is carried on the outer frame 65 and is connected to the brush 190 by means of one of the screws 191. A wire 216 has one end fastened to the collecting ring 185, extends along one side of the inner frame 82 and is connected to the lug 154 of the pole carrier having the tapered pocket 153. A second wire 217 has one end fastened to the collecting ring 185, extends along one side of the inner frame 82 and is connected to the foot 176 of the pole carrier having the tapered pocket 173. A wire 218 extends from the lead 198 and connects with the binding post 219. A wire 220 extends from the lead 199 and is connected to the binding post 221. A wire 222 extends from the binding post 219 and a wire 223 extends from the binding post 222. The two latter wires connect with a pole changer and an element to be controlled, both of which are not shown.

Electric current is furnished by the wire 210, flows through the wire 212, through the bushing 61, the wire 213, bushing 75, bushing 84, wire 214, plate 167, disk 113, end 111 of the coil 98, the coil 98, end 110, pole piece 94, shaft 104, contact ball 174, either the plate 195 or 169, then through either the wires 218 and 222 or through the wires 220, 223, thereby energizing the armature of the motor D.

To energize the field of the motor D the current from the wire 214 flows through the plate 167, extension 168, contact ring 133, wires 143, 144, brush holders 136 and 138, brushes 139 and 140, thence to the segments 107 of the commutator. The latter carry the current through the wires 120 and then through the plates 90.

Journal brackets 230 and 231 see Figs. 1, 2, 3 and 4 are mounted on the oscillating bed plate 20 for the gyroscope indicated in its entirety by the letter E. Bushings 232 and 233 are respectively secured in the top ends of the journal brackets 230 and 231. A fiber bushing 234 insulates the bushing 232 from the journal bracket 230. The gyroscope E comprises the outer frame 235 which has secured therein the pivot bearings 236 and 237. The bearing 236 is insulated from the outer frame 235 by means of the fiber bushing 238. Screw pivots 242 are in threaded engagement with bushings 232 and 233 and engage the pivot bearings 236 and 237. Lock nuts 243 secure the screw pivots 242 in position. Bushings 245 and 246 are also carried by the outer frame 235. The bushing 246 is insulated from the outer frame 235 by means of the fiber bushing 247. An inner frame 248 has secured therein the pivot bearings 249 and 250, the bearing 250 is insulated from the inner frame 248 by means of the fiber bushing 251. Screw pivots 254 are in threaded engagement with the bushings 245 and 246 and engage the pivot bearings 249 and 250. Lock nuts 255 secure the screw pivots 254 in position.

A motor housing for the gyroscope E is indicated in its entirety by the letter F, see Figs. 2, 3 and 4, which with its contents is similar to the motor housing D and its contents, with the exception that no counter weight like 124 and bushing like 102 are provided. To the lower surface of the housing F is secured a flanged sleeve 256 which has formed at its lower end a ball race 257. A washer 258 has formed on its upper face a ball race 259 and bears against the outer frame 248. Balls 260 are located in said ball race. The shaft 261 which is similar to the shaft 104 is journaled in the inner frame 248. Pins 265 and 266 are secured to the outer frame 248 by means of the screws 267 and 268. The pin 266 is insulated from the inner frame 248 by means of the fiber bushing 269. Brush carriers 270 and 271 are supported on the pins 265 and 266. Spring wires 272 and 273 respectively extend from the inner frame 248 and engage the ends of the brush carriers 270 and 271. The wire 273 is insulated from the brush carrier 271 by means of the fiber bushing 274. Brushes 278 are supported in the brush carriers 270 and 271 and bear against the commutator segments 107. A contact plate 279 is engaged by the screw 268 and bears against the copper disk 113. A fiber plate 280 with the threaded hub 281 and the metallic plate 282 are secured to the inner frame 248 by means of the screws 283. A pole carrier is indicated at 287 tapered at its end 288, and is in threaded engagement with the hub 281. A contact ball 289 is contained in said pole carrier and is forced against the opening thereof by means of the spring 290. A ring 292 encircles the hub 281 and is held in place by the top face of the pole carrier 287.

Solenoids 295 and 296 have each formed therewith a foot 297. The feet 297 are fastened to the journal brackets 230 and 231 by means of the screws 298 see Figs. 1, 2 and 18. A plunger 300 is slidably supported in the solenoid 295 and a plunger 301 is slidably supported in the solenoid 296. A cord 302 connects the plunger 300 with the ring 292 and the cord 303 connects the plunger 301 with the same ring. A contact cup see Figs. 4, 6, 7, 8 and 18, is indicated in its entirety by the letter G and is secured on the oscillating bed plate 20 in the path of the contact ball 289. It is shown to comprise four triangular contact blocks 304, 305 and 306 and 307.

The said contact blocks have a spherical concaved upper surface 308 and are embedded in the cylindrical block of insulating material 309. The surface 308 is struck with a radius equal to the distance from the center of the gyroscope E to the contact point of the ball 289. The block 304 comprises the pair of parallel serpentine contact ribbons 310 and 311 which are separated from each by the insulating material 312. The blocks 305, 306 and 307 respectively, comprise the similar pairs of serpentine contact ribbons—313, 314—315, 316—317, 318. The latter three pairs of ribbons are also separated by the insulating material 312. Metallic terminal posts indicated at 322, 323, 324 and 325 are embedded in the block 309. The ribbons 310, 318 are connected at their outer ends to the terminal post 322. The ribbons 311 and 313 are connected at their outer ends to the terminal post 323. The ribbons 314 and 315 are connected at their outer ends to the terminal post 324. The ribbons 316 and 317 are connected at their outer ends to the terminal post 325. The insulating block 309 has formed therewith the transverse wall 326 and longitudinal wall 327. A wire 328, see Fig. 2, has one end fastened to the contact wing 204 by means of the screw 205 and leads to and is connected to the inner end of the coil of the solenoid 295. A wire 329 is connected to the contact wing 202 by means of the screw 203 and leads to and is connected with the inner end of the coil of the solenoid 296. Wires 330 and 331 respectively lead from the outer ends of the coils of the solenoids 295 and 296, are spliced and form the cable 332, which is grounded. A feed wire 335 for electric current leads to and is connected to the binding post 336 on the oscillating bed plate 20. A wire 337 extends from the binding post 336 and leads to and is connected to the bushing 232. A wire 338 extends from the pivot bearing 236 and is supported on the inner face of the outer frame 235 and is connected to the bushing 246. A wire 339 extends from the pivot bearing 250, is supported on the outer face of the inner frame 248 and is connected to the screw 268. A feed wire 340 for electric current is carried on the outer face of the inner frame 248 and is connected to the pole carrier 290 by means of the screw 341. A wire 345 extends from the terminal post 323 and is connected to the binding post 346. A wire 347 extends from the terminal post 324 and is connected to the binding post 348. A wire 349 extends from the terminal post 322 and is connected to the binding post 350. A wire 351 extends from the terminal post 325 and is connected to the binding post 352. Wires 355, 356, 357 and 358 respectively extend from their accompanying binding posts 346, 348, 350 and 352 and lead to elements to be controlled. For the purpose of installation a combined longitudinal and transverse level 360, with the longitudinal glass 361 and transverse glass 362, is fastened to the oscillating bed plate 20 by means of the screws 363. The transverse level 362 is used to locate the bed plate 20 parallel with the transverse axis of the aeroplane when used for the same. The longitudinal level 361 is used to locate the bed plate 20 parallel to the longitudinal axis of the aeroplane, when the pin 45 is engaged with the shouldered portion 43 of the trip lever 42.

When the appurtenances of this electric controlling device are installed in an aeroplane, means are provided for controlling the rudder, the ailerons and the elevator.

The gyroscope C controls the rudder of the aeroplane and the gyroscope E controls the ailerons and the elevator of the aeroplane. The gyroscope C is located with the axial line of its pole carriers 153 and 173 parallel to the longitudinal axis of the aeroplane with which it is used. When the revolving field and armature contained in the motor housing D are rotated by an electric current flowing through them, the said gyroscope C will maintain itself in its initial position, regardless of any change in the direction of the longitudinal axis of the aeroplane. When the gyroscope C is located in the position shown and described, the contact ball 174 bears against the fiber block 193, and the electric circuits which would be closed when the said contact ball 174 bears against either of the contact plates 195 or 196 are open, and the rudder of the aeroplane is locked in its neutral position, by means of other mechanism not shown but which are controlled by the same. Should the aeroplane deviate from its course to the right in the direction of the arrow H, the contact plate 195 will come into contact with the ball 174. The said ball is maintained in its original position by the inertia of the gyroscope. When the contact plate 195 and the contact ball 174 are engaged, the electric circuit formed by the wires 215, 217, 218, 222, and intermediate rudder actuating mechanism above mentioned is closed and the rudder is caused to swing to bring the aeroplane back to its course.

Should the aeroplane deviate from its course to the left, opposite to the direction of the arrow H, the contact plate 196 will come into contact with the ball 174. The electric circuit formed by the wires 215, 217, 220, 223 and a second rudder actuating mechanism not shown, is closed and the rudder is caused to swing in an opposite direction to bring the aeroplane back to its course.

When the aeroplane inclines downwardly to the right, the contact ball 289 engages either one of the ribbons 311 or 313 depending upon the position of the longitudinal axis of the aeroplane. This closes an electric circuit that causes an aileron actuating mechanism not shown, to adjust the ailerons to return the aeroplane to a horizontal position. If the aeroplane should incline downwardly to the left, the contact ball 289 engages one of the ribbons 316 or 317 dependent upon the position of the longitudinal axis of the aeroplane. The engagement of the contact ball 289 with either of the ribbons 316 or 317 closes an electric circuit, that causes a second aileron actuating mechanism not shown, to adjust the ailerons to return the aeroplane to a horizontal position.

Each of the triangular contact blocks 304, 305, 306 and 307, being composed of two contact ribbons one of which forms part of a circuit for controlling the ailerons, and the other forming part of a circuit for controlling the elevator, it will be seen that when the contact ball 289 is engaged with any one of these blocks, two electric circuits are closed, one for the elevator and one for the ailerons.

The walls 326 and 327 are of such width that when the contact ball slides down these walls, it will make electric contact on one side of the wall only.

It is essential to have the planes of the aeroplane banked in the proper direction when the aeroplane is being turned. To insure the proper banking, the contact wings 202 and 204 are provided for the gyroscope C. When the aeroplane is turning, the contact ball 174 engaged either one of the contact wings 202 or 204, thereby closing an electric circuit of which one of the solenoids 295 or 296 forms a part. The electric current flowing through the circuit thus formed, energizes one of the solenoids 295 or 296 and causes the contact ball 289 to be brought into engagement with the proper contact ribbon, thus insuring the banking of the aeroplane in the proper direction. It will be noted by referring to the drawings that the contact ball 174 is engaged with either one of the contact wings 202 or 204, while the aeroplane is turning through somewhat less than a quadrant, thereby banking the aeroplane for that arc of the turn only. When the circuit formed by the engagement of the ball 174 and either of the contact wings 202 or 204 is broken, the gyroscope E again resumes its stabilizing functions and returns the aeroplane to a level keel. The aeroplane is maintained on a level keel until the contact ball 160 engages with one of the contact wings and causes a reverse banking, to take place. This action is in accordance with the practical operation of aeroplanes.

The oscillating bed plate 20 with its accompanying solenoids A and B, trip levers, 37 and 42, and accompanying mechanism, permits the automatic regulation of the upward and downward travel of the aeroplane. The oscillating bed plate 20, as shown is in the proper position to cause the aeroplane to travel in a horizontal plane. When the aeroplane is about to leave the ground the oscillating bed plate 20, is moved by hand to make an angle with the longitudinal axis of the aeroplane and maintained in that position by the engagement of the shouldered portion 38 of the trip lever 37 with the pin 40. The angular position of the oscillating bed plate 20 causes an electric circuit to be closed by the engagement of the contact ball 289 with either one of the contact ribbons 310 or 318. The electric current thus produced, passes through the elevator actuating mechanism, not shown and deflects the elevator to cause the aeroplane to rise. The coil 30 of solenoid B is connected by a switch not shown, forming part of a timing mechanism also not shown. When the aeroplane has reached the desired elevation, the said switch closes the circuit of which the coil 30 forms a part, thereby drawing into the tube 25, the movable core 26 and causing the pin 40 to be released from the shouldered portion 38. The oscillating bed plate 20 will then, by gravity swing on its pivots 21, until the pin 45 comes into engagement with the shouldered portion 43 of the trip lever 42. The plane of the oscillating bed plate 20 will then be parallel to the longitudinal axis of the aeroplane, and the gyroscope E will maintain the aeroplane in its horizontal position as before described, until the predetermined time for the aeroplane to return to a landing station. At the predetermined time for causing the aeroplane to return to the said station, the coil 29 of the solenoid A is energized by the closing of another switch forming part of the turning mechanism above mentioned. The solenoid A thus energized draws the movable core 26 into the tube 25, and causes the pin 45 to be released from the shouldered portion 43. This causes the oscillating bed plate 20 to swing on its pivots 21 until it bears on the stop pin 46. This latter angular position of the oscillating bed plate 20, causes an electric circuit to be closed by the engagement of the contact ball 289 with either one of the contact ribbons 314 or 315. The electric current thus produced, passes through another elevator actuating mechanism not shown and deflects the elevator to cause the aeroplane to descend. When the aeroplane approaches the ground the turning mechanism referred to acts on a pole changer not shown, and causes the electric current in either of the ribbons 314 or 315 to pass through the first mentioned elevator actuating mechanism, thereby deflecting the elevator to cause the aeroplane to land on a level keel.

Having described my invention what I desire to secure by Letters Patent and claim is:

1. In a controlling and stabilizing device for an aeroplane, the combination of a gyroscope, an electric contact element in the gyroscope, a pair of contact plates for the contact element, a wire for electric current for each of said contact plates to control electrical operating means for the rudder of the aeroplane, a pair of contact wings coacting with said contact element and wires extending from the contact wings to control an element which in turn controls the ailerons of the aeroplane.

2. In a controlling and stabilizing device the combination of a gyroscope, a pair of contact elements in the gyroscope, a pair of contact plates for the contact elements and movable relatively thereto, either one of said contact elements coacting with either one of said contact plates, a wire for electric current for said contact elements, a wire for electric current extending from each contact plate to control an element, a pair of contact wings movable relatively to said contact elements, either one of said contact elements coacting with either one of said contact wings, and a wire for electric current extending from each contact wing to control an element.

3. In a controlling and stabilizing device for an aeroplane the combination of a gyroscope, a pair of adjustable electric contact balls coaxial with the main axis of the gyroscope and diametrically opposite each other, a pair of spherically concaved contact plates, located to coact with said contact balls, a wire for electric current for said contact balls and a wire for electric current extending from each contact plate to control the rudder of the aeroplane.

4. In a controlling and stabilizing device for an aeroplane the combination of a gyroscope, a pair of adjustable electric contact balls coaxial with the main axis of the gyroscope and diametrically opposite each other, a pair of spherically concaved contact plates located to coact with said contact balls, a wire for electric current for said contact balls, a wire for electric current extending from each contact plate to control the rudder of the aeroplane, a pair of contact wings movable relatively to said contact balls, either one of said contact balls coacting with either one of said contact wings, and a wire for electric current extending from each contact wing to control the ailerons of the aeroplane.

5. In a controlling and stabilizing device the combination of a gyroscope, an adjustable electrical contact element in the gyroscope, a wire for electric current connected to the said contact element, four pairs of contact elements with their operating surface on a sphere, the radius of curvature of which equals the distance from the center of the gyroscope to the point of contact of the first contact element, any one pair of the four pairs of contact elements coacting with the first contact element, and a pair of wires for electric current extending from each of said pairs of contact elements to control other elements.

6. In a controlling and stabilizing device the combination of a gyroscope, an electrical contact element in the gyroscope, four pairs of contact elements coacting with the first contact element, a pair of solenoids positioned diametrically opposite each other, movable cores in said solenoids and connections between each core and the first contact element to move the latter into engagement with any one of the four pairs of contact elements.

7. In a controlling and stabilizing device for an aeroplane the combination of a gyroscope, an electric contact ball in the gyroscope, a wire for electric current connected to said ball, four pairs of serpentine electric contact ribbons, each ribbon and each pair insulated from one another and forming triangles with their apexes adjacent to one another, the four pairs of said ribbons being embedded in a block of insulating material, four metallic terminal posts for the ribbons, a wire for electric current extending from each metallic terminal post and leading to elements that control the ailerons and elevator of the aeroplane, a pair of cords with one end of each secured to the gyroscope, a pair of solenoids for the gyroscope and movable cores in said solenoids connected to the other ends of said cords, the said solenoids when energized locating the electrical contact ball in different contact positions on the contact ribbons and thereby indirectly controlling said ailerons and elevator.

8. In a controlling and stabilizing device the combination of a gyroscope, a second gyroscope, electrical connections between the gyroscopes, a movable electrical contact element on the second gyroscope, a plurality of contact elements coacting with the said movable electrical contact element of the second gyroscope, movable contact elements coacting with the first gyroscope, the first gyroscope with said movable elements controlling the position of the movable contact element of the second gyroscope, by means of the said electrical connections between the gyroscopes.

9. In a controlling and stabilizing device for an aeroplane the combination of a gyroscope to control the rudder of the aeroplane, a second gyroscope to control the ailerons and elevator of the aeroplane and means controlled by the first gyroscope to locate the second gyroscope in different positions to adjust the ailerons when the aeroplane is turning.

10. In a controlling and stabilizing device the combination of an oscillating bed plate, a pair of gyroscopes on the oscillating bed plate coacting with each other, a solenoid for the bed plate, a trip lever operated by the solenoid and a locking connection between the trip lever and the oscillating bed plate.

11. In a controlling and stabilizing device the combination of an oscillating bed plate, a pair of pins extending from the bed plate, a pair of solenoids and a trip lever actuated by each solenoid, the trip levers engaging said pins to locate the bed plate in different angular positions.

12. In a controlling and stabilizing device for an aeroplane the combination of a gyroscope, an electrical contact element in the gyroscope, a block of insulating material, and four pairs of serpentine electrical contact ribbons embedded in said block forming four triangles with their accompanying sides insulated from each other by said material, one ribbon of each pair forming part of an electrical circuit to control the ailerons of the aeroplane and the other ribbon of each pair forming part of a circuit to control the elevator of the aeroplane.

13. In a controlling and stabilizing device for an aeroplane the combination of a gyroscope, an electrical contact element in the gyroscope and four pairs of serpentine electrical contact ribbons separated by two walls of insulating material, one of said walls parallel to the longitudinal axis of the aeroplane and the other wall parallel to the transverse axis of the aeroplane, one ribbon of each of the two pairs that are located forward of the transverse wall of insulating material forming a part of an electric circuit to control the elevator of the aeroplane in one direction, one ribbon of each of the two pairs that are located to the rear of the transverse wall of insulating material forming a part of an electric circuit to control the elevator of the aeroplane in the opposite direction, one ribbon of each of the two pairs that are located to the left of the longitudinal wall of insulating material forming a part of an electric circuit to control the ailerons in one direction and one ribbon of each of the two pairs that are located to the right of the longitudinal wall of insulating material forming a part of an electric circuit to control the ailerons in an opposite direction.

Signed at the borough of Manhattan, city of New York, in the county of New York and State of New York, this 28th day of March, A. D. 1918.

ERNEST E. G. HEDENSTROM.

Witnesses:
    LOUIS F. STUMPF,
    A. A. DE BONNEVILLE.